US010885435B2

(12) United States Patent
Xiong et al.

(10) Patent No.: US 10,885,435 B2
(45) Date of Patent: *Jan. 5, 2021

(54) SYSTEM AND METHOD FOR TRAINING NEURAL NETWORKS

(71) Applicant: Deep Genomics Incorporated, Toronto (CA)

(72) Inventors: Hui Yuan Xiong, Toronto (CA); Andrew Delong, Toronto (CA); Brendan Frey, Toronto (CA)

(73) Assignee: Deep Genomics Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,683

(22) Filed: Aug. 15, 2019

(65) Prior Publication Data

US 2020/0111000 A1   Apr. 9, 2020

Related U.S. Application Data

(63) Continuation of application No. 15/067,920, filed on Mar. 11, 2016, now Pat. No. 10,410,118.

(60) Provisional application No. 62/133,000, filed on Mar. 13, 2015.

(51) Int. Cl.
*G06N 3/08* (2006.01)
*G06N 3/04* (2006.01)
*G06F 7/58* (2006.01)

(52) U.S. Cl.
CPC .............. *G06N 3/08* (2013.01); *G06F 7/58* (2013.01); *G06N 3/0454* (2013.01); *G06N 3/084* (2013.01)

(58) Field of Classification Search
CPC .......... G06F 7/58; G06N 3/0454; G06N 3/08; G06N 3/084
See application file for complete search history.

(56) References Cited

U.S. PATENT DOCUMENTS

| 6,128,609 A | 10/2000 | Rose |
| 8,697,359 B1 | 4/2014 | Zhang |
| 9,406,017 B2 | 8/2016 | Hinton et al. |
| 1,041,011 A1 | 9/2019 | Xiong et al. |
| 2005/0246297 A1 | 11/2005 | Chen et al. |

(Continued)

FOREIGN PATENT DOCUMENTS

| WO | WO-9412948 A1 | 6/1994 |
| WO | WO-2013070634 A1 | 5/2013 |
| WO | WO-2016145516 A1 | 9/2016 |

OTHER PUBLICATIONS

Barash, et al. Deciphering the splicing code. Nature. May 6, 2010; 465 (7294):53-9. doi: 10.1038/nature09000.

(Continued)

*Primary Examiner* — Robert A Cassity
*Assistant Examiner* — Brent Johnston Hoover
(74) *Attorney, Agent, or Firm* — Wilson Sonsini Goodrich & Rosati

(57) ABSTRACT

Systems and methods for training a neural network or an ensemble of neural networks are described. A hyper-parameter that controls the variance of the ensemble predictors is used to address overfitting. For larger values of the hyper-parameter, the predictions from the ensemble have more variance, so there is less overfitting. This technique can be applied to ensemble learning with various cost functions, structures and parameter sharing. A cost function is provided and a set of techniques for learning are described.

34 Claims, 5 Drawing Sheets

(56) References Cited

U.S. PATENT DOCUMENTS

| | | |
|---|---|---|
| 2011/0087627 A1 | 4/2011 | Schmid et al. |
| 2011/0313961 A1 | 12/2011 | Toscano et al. |
| 2012/0310539 A1 | 12/2012 | Crockett et al. |
| 2013/0096838 A1 | 4/2013 | Fairbrother |
| 2013/0332081 A1 | 12/2013 | Reese et al. |
| 2014/0011977 A1 | 1/2014 | Krainer et al. |
| 2014/0199698 A1 | 7/2014 | Rogan et al. |
| 2014/0359422 A1 | 12/2014 | Bassett, Jr. et al. |
| 2015/0066378 A1 | 3/2015 | Robison et al. |
| 2015/0100530 A1 | 4/2015 | Mnih et al. |
| 2016/0098632 A1 | 4/2016 | Sutskever et al. |
| 2016/0364522 A1 | 12/2016 | Frey et al. |
| 2017/0061279 A1 | 3/2017 | Yang et al. |

OTHER PUBLICATIONS

Hatzigeorgiou, et al. Functional site prediction on the DNA sequence by artificial neural networks. IEEE International Joint Symposia on Intelligence and Systems, Nov. 4-5, 1996, p. 12-17, Print ISBN: 0-8186-7728-7.

Hebsgaard, et al. Splice site prediction in *Arabidopsis thaliana* pre-mRNA by combining local and global sequence information. Nucleic Acids Res. Sep. 1, 1996; 24(17):3439-52.

Hinton, et al. Distilling the knowledge in a neural network. arXiv preprint arXiv:1503.02531 (2015).

Hinton, et al. Improving neural networks by preventing co-adaptation of feature detectors. arXiv preprint arXiv:1207.0580 (2012).

International Search Report corresponding to PCT/CA2016/050689; Canadian Intellectual Property Office; dated Jul. 27, 2016.

International Search Report for PCT/CA2016/050273, dated Jun. 15, 2016.

Jin, et al. Neural network regularization and ensembling using multi-objective evolutionary algorithms. Proceedings of Congress on Evolutionary Computation, 2004, pp. 1-8.

Leung, et al. Deep learning of the tissue-regulated splicing code. Bioinformatics vol. 30, pp. i121-i129, Jun. 15, 2014.

Office action dated Jul. 10, 2017 for U.S. Appl. No. 14/739,432.

Quang, et al. DANN: A deep learning approach for annotating the pathogenicity of genetic variants. Bioinformatics. Mar. 1, 2015; 31(5):761-3. doi: 10.1093/bioinformatics/btu703. Epub Oct. 22, 2014.

Reese, M. G. Application of a time-delay neural network to promoter annotation in the *Drosophila melanogaster* genome. Comput Chem. Dec. 2001; 26(1):51-6.

Srivastava, et al. Dropout: a simple way to prevent neural networks from overfitting. Journal of Machine_earning Research 15.1 (2014): 1929-1958.

U.S. Appl. No. 15/067,920 Office Action dated Aug. 7, 2018.

U.S. Appl. No. 15/067,920 Office Action dated Jan. 11, 2019.

U.S. Appl. No. 15/067,920 Notice of Allowance dated Apr. 24, 2019.

Written Opinion of the International Search Authority for PCT/CA2016/050273, dated Jun. 15, 2016.

Written Opinion of the International Searching Authority corresponding to PCT/CA2016/050689; Canadian Intellectual Property Office; dated Jul. 27, 2016.

Xiong, et al. The human splicing code reveals new insights into the genetic determinants of disease. Science DOI: 10.1126/ science. 1254806. Published Online Dec. 18, 2014.

Yu, et al. Multistage RBF neural network ensemble learning for exchange rates forecasting. Neurocomputing, vol. 71, Issues 16-18, Oct. 2008, pp. 3295-3302.

Zhang, et al. Prediction of watershed runoff using Bayesian concepts and modular neural networks. Water Resources Research. 2000; vol. 36 No. 3 pp. 753-762.

SYSTEM AND METHOD FOR TRAINING NEURAL NETWORKS

CROSS-REFERENCE

This application is a continuation of U.S. application Ser. No. 15/067,920, filed Mar. 11, 2016 (now U.S. Pat. No. 10,410,118, issued Sep. 10, 2019), which application claims the benefit of U.S. Provisional Application Ser. No. 62/133,000, filed Mar. 13, 2015, each of which is entirely incorporated herein by reference.

TECHNICAL FIELD

The following relates generally to ensemble learning and more specifically to training an ensemble of neural networks with or without shared parameters.

BACKGROUND

A feedforward, artificial neural network uses layers of non-linear "hidden" units between its inputs and its outputs. Each unit has a weight vector that is determined during learning, which can be referred to as the training stage. In the training stage, the feature vectors are first initialized by a pre-determined random or pseudo-random algorithm. After that, a training set of data (a training set of inputs each having a known output) is used by a learning algorithm to adjust the feature vectors in the neural network. It is intended that the neural network learn how to provide an output for new input data by generalizing the information it learns in the training stage from the training data. Generally, during different stages of training, a validation set is processed by the neural network to validate the results of training and to select hyper-parameters used for training. Finally, test data (i.e., data for which generating an output is desired) can be processed by a validated neural network. The purpose of training is to adapt the weights on the incoming connections of hidden units to learn feature detectors that enable it to predict the correct output when given an input vector. If the relationship between the input and the correct output is complicated and the network has enough hidden units to model it accurately, there will typically be many different settings of the weights that can model the training set almost perfectly, especially if there is only a limited amount of labeled training data. Each of these weight vectors will make different predictions on held-out test data and almost all of them will do worse on the test data than on the training data because the feature detectors have been tuned to work well together on the training data but not on the test data.

This is caused by the overfitting problem, which occurs when the neural network is encouraged to memorize the training data that it is provided, rather than learning the relationship between the output and the input vector that can generalize to new examples. Generally, the overfitting problem is increasingly likely to occur as the complexity of the neural network increases.

Instead of relying on a single model comprising a single neural network to generate an output, an ensemble of models, comprising a plurality of neural networks can be provided to generate an output. The average prediction (i.e., the average of the outputs) of the plurality of neural networks in the ensemble tends to outperform the prediction of individual neural networks in the ensemble. Because different models in an ensemble tend to make different errors on test data, averaging models trained with different random initializations, different architectures, different hyper-parameter settings and different subsets of data usually yield improved accuracy and often yield a substantial improvement. Most machine learning challenges, such as the Netflix™ prize, have been won using ensemble approaches. These improvements may come at the expense of the additional engineering effort and additional computational resources that are required to train independent models.

SUMMARY

In one aspect, a computer-implemented method for use in training a plurality of neural networks is provided, the method comprising: obtaining at least one training data item; computing outputs from one or more members within the plurality of neural networks for the at least one training data item; combining one or more of the outputs to form an aggregate output; selecting at least one neural network from the plurality of neural networks; computing a variance-adjusted output for each selected neural network by summing the aggregate output with a fixed multiple (a) of a difference between the output of the selected neural network and the aggregate output for the at least one training data item; computing a difference between the variance-adjusted outputs and a desired output for the training data item; and adjusting at least one parameter of the plurality of neural networks to reduce the difference between the variance-adjusted outputs and the desired output.

In another aspect, a computer-implemented method for use in training a neural network is provided, the method comprising: obtaining at least one training data item; computing a plurality of training outputs by repeatedly applying the neural network to the at least one training data item while disabling at least one of the hidden units or input units randomly with the predetermined probability, or pseudo-randomly with the predetermined probability, or using a predetermined set of binary masks that use the predetermined probability and where each mask is used only once, or according to a fixed pattern that uses the predetermined probability; computing aggregate training outputs for the at least one training data item, by averaging of the plurality of training outputs or by majority voting of the plurality of training outputs; for each training output, computing a variance-adjusted training output by summing the aggregate training output with a fixed number (a) times a difference between the training output and the aggregate training output; and adjusting at least one parameter of the neural network to reduce the difference between the variance-adjusted training outputs and a desired training output for the at least one training data item.

These and other aspects are contemplated and described herein. It will be appreciated that the foregoing summary sets out representative aspects of a system and method for training neural networks and assists skilled readers in understanding the following detailed description.

DESCRIPTION OF THE DRAWINGS

The features of the invention will become more apparent in the following detailed description in which reference is made to the appended drawings wherein.

DETAILED DESCRIPTION

Figure 1:
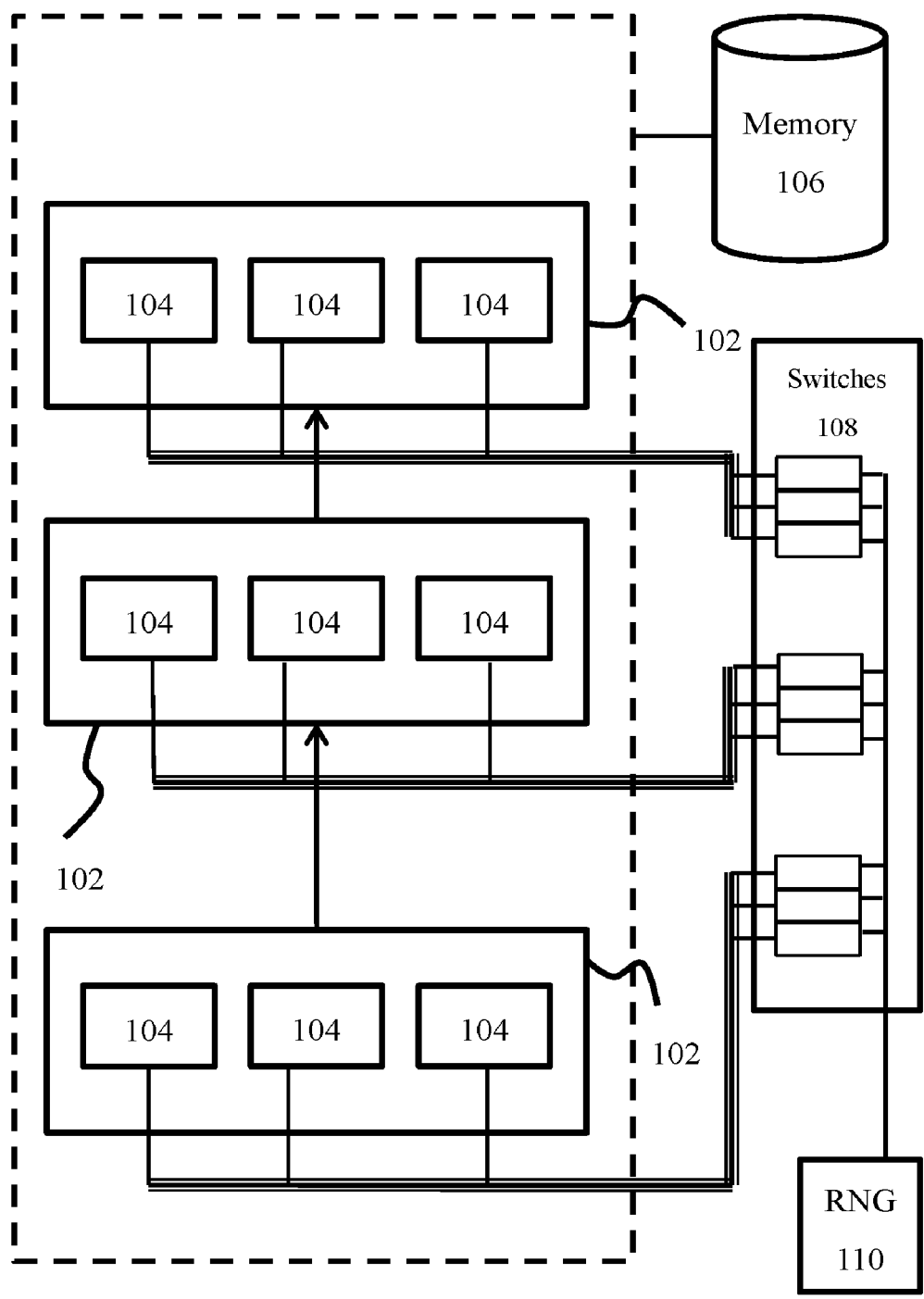
FIG. 1 is an architecture diagram of a system for training a neural network.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

A system and method for addressing overfitting in a neural network are provided. In one aspect, a stochastic gradient descent process may be applied for training the neural network on mini-batches of training cases processed using a dropout neural network training process.

The system and method provided herein can be used to improve the performance of dropout training by adjusting the variance of predictions introduced by dropout during training, and can be referred to for convenience as variance-adjustable dropout. When training a neural network, overfitting may occur if a neural network effectively memorizes the training data that it is provided, without being capable of generalizing well to new examples. One approach to addressing overfitting is referred to as dropout, which selectively disables a randomly (or pseudorandomly) selected subset of hidden units and/or input units in the neural network, for each training case, and adapts the weights of the units accordingly during application of the neural network in the test stage. This approach has been found to prevent complex co-adaptations between hidden units, for example where a particular hidden unit is only helpful in the context of several other specific hidden units.

Dropout training of a single neural network has the effect of creating an exponentially large ensemble of neural networks with different structures, but with shared parameters, which may provide improved computational efficiency at training time and at testing time.

Dropout training facilitates training an ensemble of exponentially many neural networks, almost as efficiently as a single neural network, through the use of parameter sharing. Ensemble learning using dropout training may provide significant improvements for a wide variety of real-world problems, ranging from image classification to machine translation. Methods of ensemble learning implementing dropout training for deep neural networks are described herein. Particularly, a method of ensemble learning implementing variance-adjustable dropout training is described. Until now, it has been commonly assumed that the models in an ensemble should be trained as independently as possible, so that they make independent errors at test time. The standard training technique is to minimize the discrepancy between the prediction of each model to the target, without regard to the predictions of other members in the ensemble.

The following provides a feedforward neural network training system comprising an extra hyper-parameter that controls the variance of the ensemble predictors and generalizes ensemble learning. The hyper-parameter can be smoothly adjusted to vary the behaviour of the method from a single model learning to a family of ensemble learning comprising a plurality of interacting models. This technique can be applied to ensemble learning with various cost functions, structures and parameter sharing. A cost function is provided and a set of techniques for learning are described.

In one aspect, different neural networks in the plurality of neural networks differ only in that during the forward pass, feature detectors are selectively disabled randomly, pseudo-randomly or using a fixed or predetermined pattern, in the fashion of the Dropout procedure, and the selection of feature detectors to be deactivated is not the same in different neural networks. An example of a suitable fixed or predetermined pattern is an irrational number such as Pi. For example, hidden units or input units may be disabled randomly with a predetermined probability (the dropout probability), or pseudo-randomly with the predetermined probability, or using a predetermined set of binary masks that use the predetermined probability and where each mask is used only once, or according to a fixed pattern that uses the predetermined probability;

Referring now to FIG. 1, a feedforward neural network (100) having a plurality of layers (102) is shown. Each layer comprises one or more feature detectors (104), each of which may be associated with activation functions and weights for each parameter input to the respective feature detector (104). Generally, the output of a feature detector of layer i may be provided as input to one or more feature detector of layer i+1. In embodiments, the output of a feature detector of layer i could further be provided as input to layer i+n, where n is a positive integer. In yet further embodiments, the output of a layer i may be compared to a target value in a training dataset, but at the same time provided as input to other layers.

The neural network is implemented by one or more processors. Each feature detector may be considered as a processing "node" of the network and one or more nodes may be implemented by a processor. Further, it will be understood that each feature detector may be considered to be associated with a hidden unit or an input unit of the neural network for a hidden layer or an input layer, respectively.

Though an illustrative feedforward network is described, the type of neural network implemented is not limited merely to feedforward neural networks but can also be applied to any neural networks, including convolutional neural networks, recurrent neural networks, auto-encoders and Boltzmann machines. Further, the neural networks may comprise linear regression models, logistic regression models, neural network models with at least one layer of hidden units, or a combination thereof. In addition, this method is generally applicable to supervised machine learning methods that are not generally regarded as neural networks, such as regression trees, random forests, and support vector machines.

A memory (106) may be provided for storing activations and learned weights for each feature detector. The memory (106) may further store a training set comprising training data. The training data may, for example, be used for image classification in which case the training data may comprise images with known classifications. The memory (106) may further store a validation set comprising validation data.

During the training stage, the neural network optimizes weights for each feature detector. After learning, the optimized weight configuration can then be applied to test data. Exemplary applications of such a neural network include image classification, machine translation, object recognition, speech recognition and genomic-oriented applications (including, for example, protein binding site prediction and splice site prediction).

A set of switches (108) are linked to at least a subset of the feature detectors. Each switch is operable to selectively disable its respective feature detector in the neural network to which it is linked, with a learned or preconfigured probability. A random or pseudorandom number generator (110) may be linked to the switch to provide the switch with a random or pseudorandom number value that enables the switch to selectively disable each linked feature detector. The possible values generated by the random number generator (110) each correspond to a decision of whether to disable any particular feature detector in accordance with the preconfigured probability.

In embodiments, the input to the switches (108) as defined by the output of the random number generator (110) may be pseudorandom and controlled by an input to the random number generator (110). As an example, a string or set of strings could be input to the random number generator (110), which passes characters of the strings to the switches (108) to provide output.

In an embodiment, the switches (108) are linked to all feature detectors of the hidden layers. In another embodiment, the switches (108) are linked to all feature detectors of the input layers. In yet another embodiment, the switches (108) may be linked to all feature detectors in both the hidden and input layers. In yet another embodiment, the switch (108) may be linked to the feature detectors of a subset of the input and hidden layers. In yet further embodiments, the switches may be linked to the connections between neural network units. In another aspect, the switch may be connected to all hidden layers that are fully connected layers.

The switch translates the random number generated by the random number generator (110) to either a specific activation or deactivation of each of the connected feature detectors (104). The translation is made in accordance with the method that is described herein, specifically by implementing the variance adjustment process described herein.

Figure 2:
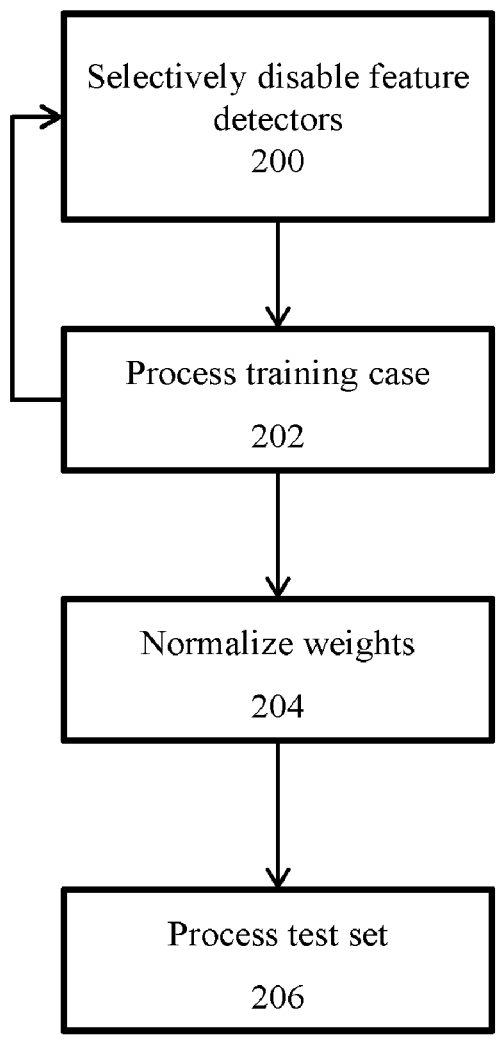
FIG. 2 is a flowchart for training a neural network.

Referring now to FIG. 2, during the training stage, a plurality of training cases are presented to the neural network in order to train the neural network. For each such training case, the switch selectively disables a subset of the feature detectors to which it is linked (200). In particular embodiments, the switch is configured to disable each such feature detector in accordance with a preconfigured or computed probability. In an exemplary dropout process, for example, feature detectors in hidden layers may be selectively disabled with probability 0.5 (that is, on average, each feature detector will be enabled for half of the training cases and disabled for the other half of the training cases) while feature detectors of input layers are disabled with probability 0.2 (that is, on average, these feature detectors will be enabled for 80% of training cases and disabled for 20% of training cases). Therefore, in this example, for each training case, each hidden layer feature detector is randomly omitted from the network with a probability of 0.5 and each input layer feature detector is randomly omitted from the network with a probability 0.2, so each hidden or input feature detector cannot rely on other hidden or input feature detectors being present. Thus, co-adaptation of feature detectors may be reduced.

Each training case is then processed by the neural network, one or a mini-batch at a time (202). For each such training case, the switch may reconfigure the neural network by selectively disabling each linked feature detector.

Once the training set has been learned by the neural network, the switch may enable all feature detectors and normalize their outgoing weights (204). Normalization comprises reducing the outgoing weights of each feature detector or input by multiplying them by the probability that the feature detector or input was not disabled. In an example, if the feature detectors of each hidden layer were selectively disabled with probability 0.5 in the training stage, the outgoing weights are halved for the test case since approximately twice as many feature detectors will be enabled. A similar approach is applied to the input layers. The test set may then be processed by the neural network (206).

Dropout training for a neural network can be derived by assuming that each training case processed during the training stage contributes the following cost, which may be combined across a mini batch of training cases or an entire training set, when computing gradients used to update weights:

$$C = -\frac{1}{M}\sum_m l(f(x, m, w), t) \qquad (1)$$

where t is the target, $f(x, m, w)$ is a prediction for the target (i.e. an output), which is based on an input x, a dropout mask m, and the parameters w. m is a binary mask vector that specifies which hidden variables and inputs are disabled. Disabling of hidden variables and inputs may be effectuated in a particular neural network by a set of switches as described in relation to network (100). M is a very large number representing the total number of possible masks. l is the log-likelihood of the prediction given the target. A term corresponding to the probability of hidden variables and inputs being disabled may be included, referred to as the dropout probability. For simplicity, it may be assumed that dropout probability is 0.5 so that each mask bit is equally likely to be turned on or off. The above objective function provided by equation (1) can be considered as the average log likelihood of an ensemble of networks indexed by m.

Dropout training may then proceed by stochastically obtaining terms in the gradient:

$$\frac{dC}{dw} = -\frac{1}{M}\sum_m \frac{d}{df}l(f(x, m, w), t)\frac{d}{dw}f(x, m, w) \qquad (2)$$

where $$\frac{d}{df}l(f(x, m, w), t)$$

is the gradient of the log-likelihood function with respect to the prediction f(x, m, w) and $$\frac{d}{dw}(f(x, m, w))$$

is the gradient of the prediction of the neural network with mask m with respect to the parameters. During dropout training, a joint setting of m is sampled for each presentation of a training case and this corresponds to a randomly sampled element in the sum in the above equation. For each mini-batch of training cases, forward propagation may be used to determine f(x, m, w) and then the error at the output may be computed in accordance with $$\frac{d}{df}l(f(x, m, w), t).$$

A backward pass may be used to determine $$\frac{d}{df}l(f(x, m, w), t) \cdot \frac{d}{dw}(f(x, m, w))$$

using hidden unit settings obtained during the previous forward pass.

In the test stage, the ensemble of networks configured by dropout training can be averaged to produce a single prediction, referred to as an aggregate output.

$$E[f(w, x)] = \frac{1}{M}\sum_m f(x, m, w) \qquad (3)$$

Computation of the above sum is often considered to be computationally intractable and may be approximated using Monte Carlo samples:

$$E[f(w, x)] \approx \frac{1}{N}\sum_{i=1}^{N} f(x, m_i, w) \qquad (4)$$

where i indexes a set of randomly drawn mask vectors. N forward passes may be used to obtain a this Monte Carlo estimation, which is computationally expensive.

Alternatively, a "mean network" can be used to approximately compute the average prediction:

$$E[f(w, x)] \approx \bar{f}(x, w) \qquad (5)$$

The mean network, $\bar{f}(x, w)$, is constructed by performing forward propagation using the mean contribution that the inputs to a unit make, by averaging the effects of their mask variables. This is equivalent to scaling all outgoing weights of every unit by one minus the dropout probability of that unit, as shown in (204). As a result, after scaling the weights, only one forward pass is required to make a prediction, making the computational cost as low as a traditional neural network trained without dropout.

In some embodiments the aggregate output may be calculated by averaging or majority voting of predictions.

In the following, for simplicity and clarity of illustration, training will be described utilizing the mean network approximation for dropout training, although other methods for approximating the mean prediction can be used, including the Monte Carlo approximation and specifically a Monte Carlo approximation where N=1.

Figure 3:
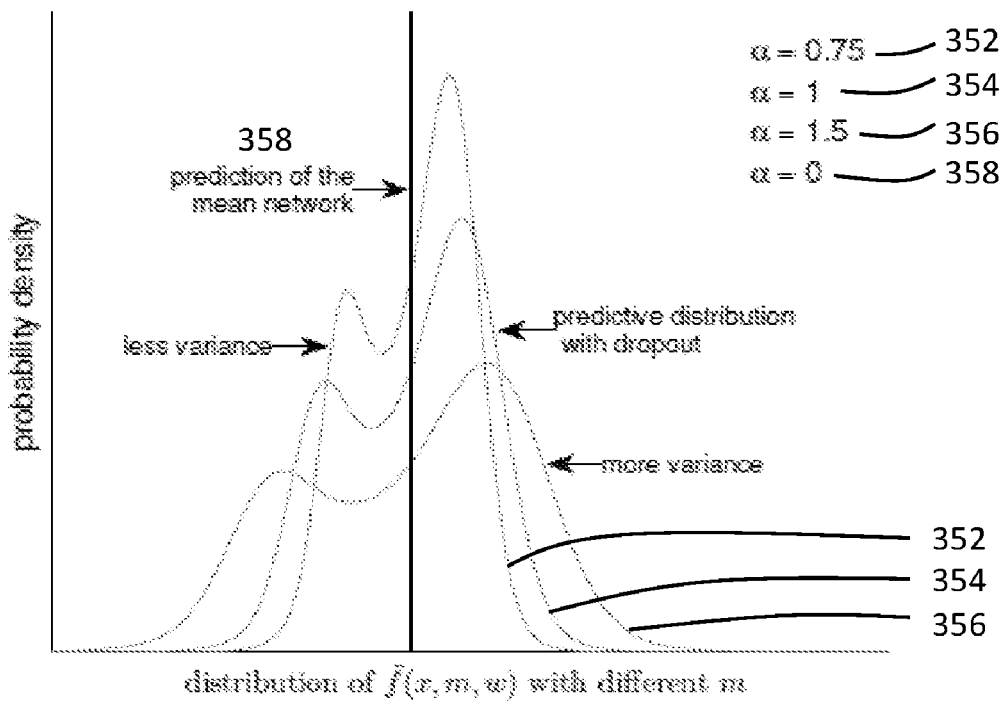
FIG. 3 is a table showing changes to predictions from a neural network with different variances from the mean neural network prediction.

Dropout training, when implemented using suitable parameters, can be considered as improving generalization performance by introducing a distribution of networks with different structures during training. Networks from this distribution produce different predictions f(x, m, w) for the same x and w. During training, these predictions are randomly sampled to produce errors that are then back propagated to generate gradients for updating the network parameters. The prediction f(x, m, w) of a training example can be considered as a random variable with a distribution centered around $\bar{f}(x, w)$, as illustrated in FIG. 3. Around $\bar{f}(x, w)$, the distribution has a spread with some variance that depends on factors including the hidden unit activities and the dropout probability. This variance is instrumental in preventing the network from overfitting to training data, by encouraging parameter settings that minimize the distance of all f(x, m, w) to the target, as opposed to just the distance of $\bar{f}(x, w)$ to the target.

The variance introduced by dropout training depends on the dropout probability. Where dropout probabilities are set to be zero, f(x, m, w) is equivalent to $\bar{f}(x, w)$, since m will be a vector of ones (such that no feature detector will be disabled). Where the dropout probabilities are not set to zero, each hidden unit may be viewed as an independent Bernoulli random variable and adds a certain amount of variance to the input of the next layer. This variance is equal to $p \cdot (1-p) \cdot (w^2 \cdot a^2)$, where p, w and a are the dropout probability, the unit-to-unit connection strength and the hidden unit activation respectively.

It may be observed that given w and a, a dropout probability of 0.5 achieves the maximum variance. It may further be observed that p=0.5 for hidden units gives good generalization performance. Accordingly, more variance may further improve generalization performance by regularizing the neural network even more than dropout with p=0.5. However, within the standard dropout training framework, there is no way to further increase the variance of f(x, m, w).

Accordingly, the system and method provided herein enable the variance of f(x, m, w) to be adjusted during training so that the regularization strength may be better tuned and better performance can be achieved, the method being generally referred to as variance-adjustable dropout.

A new random predictor $\tilde{f}(x, m, w)$ is provided, which is the variance-adjusted version of f(x, m, w), and an adjusted cost function that is based on the new predictor is provided, as follows:

$$\tilde{f}(x, m, w) = \bar{f}(x, w) + \alpha(f(x, m, w) - \bar{f}(x, w)) \quad (6)$$

$$C = -\frac{1}{M}\sum_{m} l(\tilde{f}(x, m, w), t)$$

By using the mean network approximation described above in equation 5, the new predictor $\tilde{f}(x, m, w)$ adjusts the variance of $f(x, m, w)$ by a factor of $\alpha^2$. Variance-adjustable dropout training thus makes use of an additional hyperparameter $\alpha$, which may be set using cross-validation. The search for a may be combined with the search for other hyper-parameters, to produce a jointly optimal hyper-parameter setting, using a grid search, random search, Bayesian hyper-parameter optimization, or a combination of these. Further, the parameter $\alpha$ may be determined by examining a plurality of values for $\alpha$, computing the outputs for data items in a held out validation set, computing the validation error or the validation log-likelihood for each $\alpha$, and selecting the value of a that has the lowest error or the highest log-likelihood.

When $\alpha=0$, $\tilde{f}(x, m, w)$ is deterministic and the training procedure is effectively the same as a regular feed-forward neural network. When $\alpha=1$, $\tilde{f}(x, m, w)$ is the same as the regular dropout predictor $f(x, m, w)$. When $\alpha$ is not 1 or 0, $\tilde{f}(x, m, w)$ is an extension of the difference that dropout makes to regular neural network in either the direction of less variance ($0<\alpha<1$), or of more variance ($\alpha>1$). In many situations, it has been found that the latter case produces performance that is not achievable with existing learning approaches.

When testing the neural network after training, the average of the new predictor may be used, which can be approximated by the mean network. Therefore, similar to dropout training, the proposed method produces a regular fully connected neural network after training. However, variance-adjustable dropout may produce substantially different networks and may be found to yield gains in performance.

During back-propagation, the gradient of w may be a weighted sum of the gradient of the mean network and the gradient of the dropout network:

$$\frac{dl}{dw} = \frac{dl}{d\tilde{f}}\frac{d\tilde{f}}{dw} = \frac{dl}{d\tilde{f}}\left((1-\alpha)\frac{d\bar{f}}{dw} + \alpha\frac{df}{dw}\right) \quad (7)$$

In the above equation, the gradient of the adjusted output $$\frac{dl}{d\tilde{f}}$$

may be scaled and back-propagated across the two networks.

Figure 4:
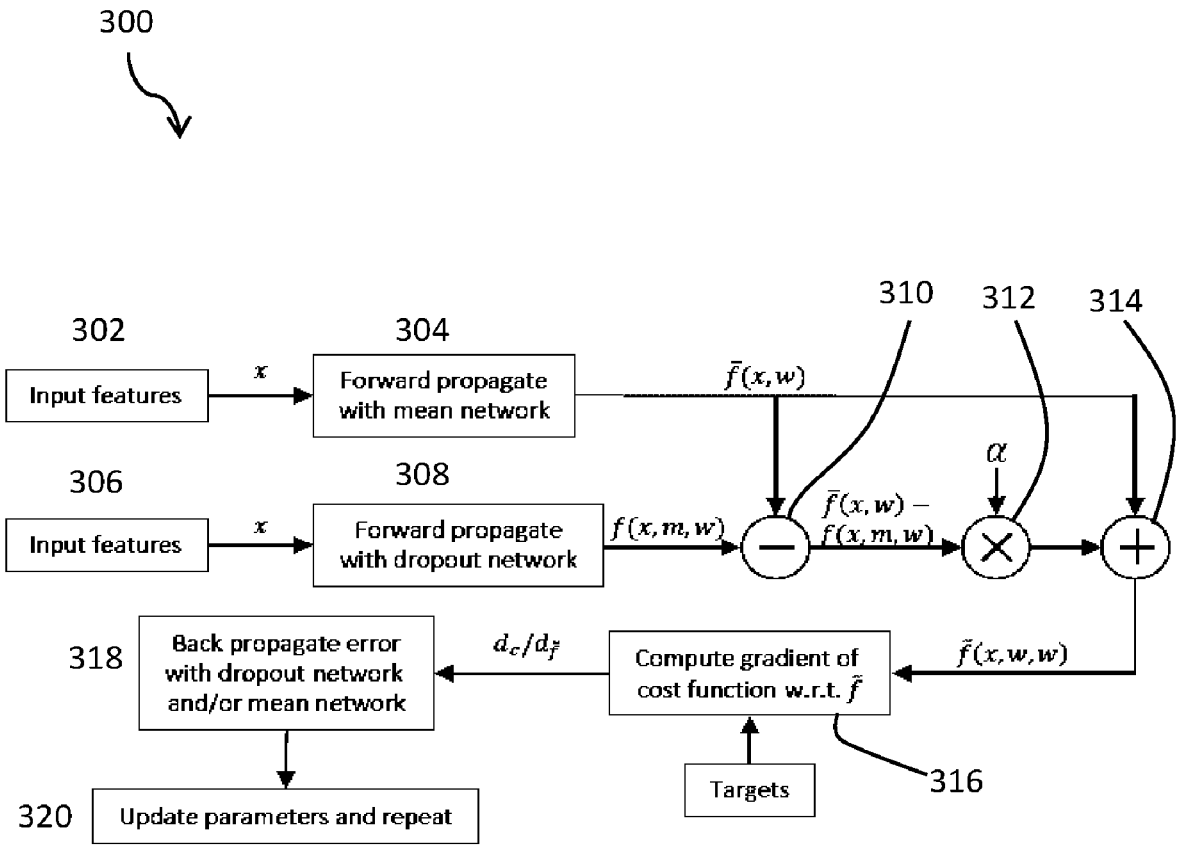
FIG. 4 is a method of dropout training with adjustable prediction variance.

Referring now to FIG. 4, shown therein is a flowchart of a proposed method of training comprising variance-adjustable dropout, shown as method 300. At blocks (302), (306), the inputs of a mini-batch of training cases are forward propagated using two networks with shared parameters. One of these networks is the mean network described above and shown at the top of the figure, which does not employ dropout, but uses scaled parameters during forward propagation, at block (304). The prediction of this network is denoted as $\bar{f}(x, w)$. The other network is a dropout network, shown in the middle of the figure, which samples a set of mask variables during forward propagation, at block (308). Its prediction is denoted as f(x, m, w). At block (310), the prediction f(x, m, w) is subtracted from the prediction $\bar{f}(x, w)$. At block (312), the difference between f(x, m, w) and $\bar{f}(x, w)$ is adjusted by the hyperparameter $\alpha$. At block (314) $\bar{f}(x, w)$ is added, providing the new predictor $\tilde{f}(x, m, w)$. At block (316), $\tilde{f}(x, m, w)$ is then compared to the target (referred to as a desired output) and the error is computed using $\tilde{f}(x, m, w)$. The difference between the variance-adjusted output and the desired output may be computed using squared error, absolute error, log-likelihood or cross-entropy. The error is then back-propagated at block (318) through the two networks according to equation 7. After that, the network parameters are updated at block (320) and the training procedure may move on to the next mini-batch. The parameters may be adjusted using the gradient or the Hessian of a log-likelihood function or a squared error function, evaluated using the desired output and the variance-adjusted output. The parameters may further be adjusted using the parameters are adjusted using gradient descent, stochastic gradient descent, momentum, Nesterov's accelerated momentum, AdaGrad, RMSProp, conjugate gradient, or a combination of these.

As the proposed method (300) performs forward and backward propagation twice, it will be appreciated that this may result in about twice the computation time as compared to learning using regular dropout.

Variance-adjustable dropout as provided by method (300) can be applied not only to the output layer but also to the hidden layers and even the input layer of neural networks. When applied to hidden layers, hidden unit activations computed with dropout may be compared to and adjusted against the hidden unit activation in the mean network. After that, they are propagated to the next layer. This procedure can be applied to the inputs as well.

The mean network (304) may be replaced by a Monte Carlo estimator of the ensemble mean as described in equation (5). One advantage of using a Monte Carlo estimator is that the Monte Carlo approximation is exact in expectation whereas the mean network is an approximation whose accuracy depends on the neural network and may deteriorate during variance-adjustable dropout training. Disadvantages of using a Monte Carlo estimation may include higher computational cost and higher variances. In particular, a Monte Carlo estimation with N=1 may be used, in which case the mean network is replaced by another dropout network with a set of independently generated masks.

Variance-adjustable dropout can be applied before or after non-linear activation functions. Activation functions such as softmax and sigmoid have a bounded output that ranges between 0 and 1. In addition, some cost functions, such as the cross-entropy cost function, have a bounded input range. As a result, if the variance of the prediction is adjusted after the non-linearity, the value may be out of range for some training cases. In these situations, the cost function and the gradient may not be able to be evaluated mathematically. However, the normal back-propagation technique can still be applied to compute a surrogate of derivatives used for learning, even though the cost function is not well defined. In particular, for the softmax activation function, the error of the softmax inputs may be the target minus the adjusted prediction. Alternatively, the variance of the pre-nonlinearity value, which is usually unbounded, can be adjusted. It may be found that applying variance-adjusted dropout to the output layer using both the pre-nonlinearity approach and the post-nonlinearity approach provides improved results over regular dropout.

In the following paragraphs, the above-described embodiments are described in relation to ensemble learning of neural networks in general. We view ensemble learning of neural networks as a type of dropout training and describe the proposed variance-adjustable dropout technique for improving ensemble learning.

In the following description, what we refer to neural networks include embodiments of neural networks with different depths, structures, activation functions, loss functions, parameter regularization, parameter sharing and optimization methods. These embodiments include linear regression, ridge regression, lasso, polynomial regression, logistic regression, multinomial regression, convolutional networks and recurrent neural networks.

In conventional ensemble learning, models in the ensemble, each of which may comprise a neural network, do not have tied weights and may have different architectures. Each model in the ensemble is generally optimized independently. This may be considered to be roughly equivalent to optimizing the average of the cost function of models in the ensemble:

$$C = -\frac{1}{n}\sum_{i=1}^{n} l(f_i(x, w_i), t) \quad (8)$$

where $f_i(x,w_i)$ is the i-th model with parameters $w_i$. When testing the ensemble, predictions from the models in the ensemble are averaged.

From both the modelling and the optimization aspects, regular ensemble learning using neural networks may be considered to be a very large neural network that encompasses the individual networks of the ensemble, i.e. of a plurality of neural networks. These individual networks may be connected to the inputs in parallel and produce n "pre-outputs", $f_i(x, w_i)$, i=1, ..., n. These "pre-outputs" may then connected by a linear layer with weights set to 1/n, forming the actual output $\bar{f}$.

A special type of dropout is applied, wherein all pre-outputs but one are randomly dropped out, during training of conventional ensemble learning models. As a result, back-propagation compares the prediction of the single active model to the target and may propagate that error across the single active model. However, during testing, the models may be linearly combined to make a prediction.

Variance-adjustable dropout, as described above in relation to method (300), can be applied to ensemble learning when the parameters are not necessarily tied. For a general method of variance-adjustable ensemble learning, predictions of models in the ensemble may be adjusted relative to the mean prediction of the ensemble, referred to as an aggregate output. Then, parameters of the models may be updated based on the comparison of the adjusted prediction with the target.

$$\bar{f}(x, w) = \frac{1}{n}\sum_{i=1}^{n} f_i(x, w_i) \quad (9)$$

$$\tilde{f}_i(x, w) = \bar{f}(x, w) + \alpha(f_i(x, w_i) - \bar{f}(x, w))$$

where $f_i$ is the prediction of the i-th model with parameters $w_i$, $\bar{f}$ is the mean prediction of the ensemble and w denotes the collection of $\{w_i\}$. When training the ensemble, for the i-th model in the ensemble, it may be necessary to back-propagate the error at the output, $dl/\tilde{f}_i(x, w)$. In contrast to regular ensemble learning, $dl/\tilde{f}_i(x, w)$ for variance-adjustable ensemble learning depends on all models because the use of the mean prediction. An implementation of back-propagation that asynchronously processes $dl/\tilde{f}_i(x, w)$ one at a time will require $O(n^2)$ time complexity for each pass through all of the n models. For each i, it may be necessary to perform forward and backward propagation through all n models.

Accordingly, to speed up computation, a synchronized variance-adjustable ensemble training method is provided, which may be no more computationally expensive than regular ensemble training and has O(n) time complexity. In this method, all models in the ensemble process the same set of training data points so that the results of forward and back propagation can be reused. According to the method, first, forward passes may be performed to compute all $f_i$ and in turn $\bar{f}$ and all $\tilde{f}_i$. Then, $\tilde{f}_i$ may be compared to the target to compute $dl/\tilde{f}_i$. This may then be back-propagated to the output of all the individual networks but not any further. At the output of every individual network, all of the gradients of all other networks are collected before back-propagating across the network, so that the errors are processed together. In particular, the i-th network collects gradients as follows:

$$\frac{dl}{df_i} = \sum_{j=1}^{n} \frac{dl_j}{\tilde{f}_j} \quad (10)$$

$$\frac{dl}{df_i} = (1-\alpha)\frac{1}{n}\sum_{j=1}^{n} \frac{dl_j}{\tilde{f}_j} + \alpha\frac{dl_i}{df_i}$$

After this collection step, every individual network can back-propagate the collected gradient in a single sweep, resulting in a requirement of only n forward passes and n backward passes.

Figure 5:
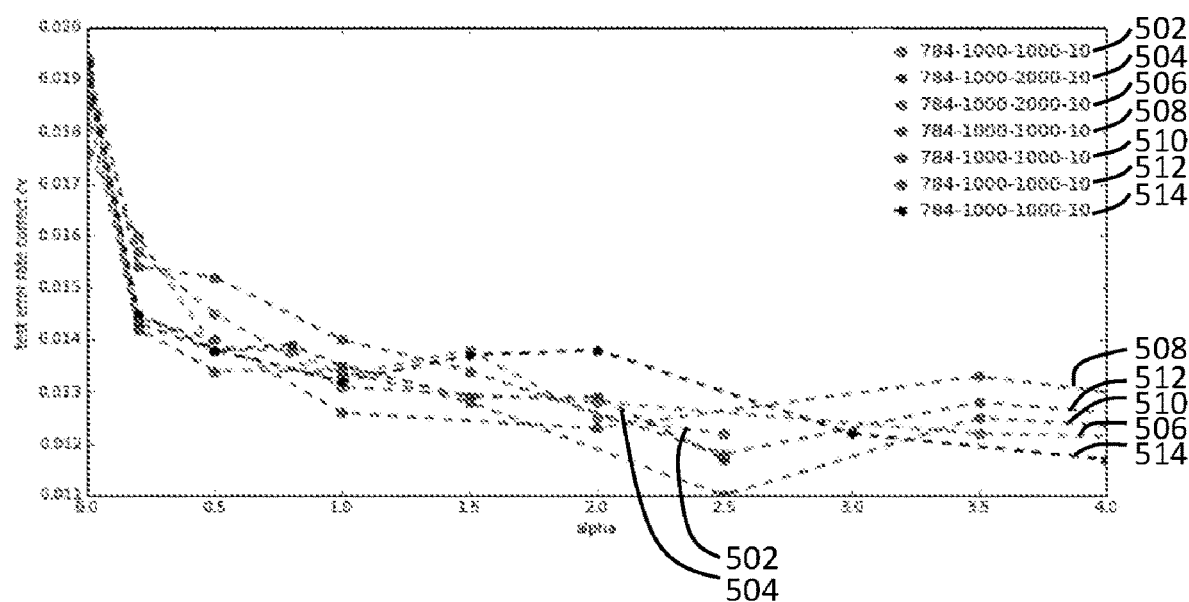
FIG. 5 is a table showing possible error rates for networks trained using MNIST data.

Referring now to FIG. 5 shown therein are possible results for an error rate for held out test data (10,000 cases), when variance-adjustable dropout is used to train networks on handwritten MNIST digits. Such results would indicate that setting $\alpha>1$ leads to better classification performance.

Although the invention has been described with reference to certain specific embodiments, various modifications thereof will be apparent to those skilled in the art without departing from the spirit and scope of the invention as outlined in the claims appended hereto.

The invention claimed is:

1. A system for training a plurality of neural networks, the system comprising one or more computer processors and one or more computer-readable media operatively coupled to the one or more computer processors, wherein the one or more computer-readable media store instructions that, when executed by the one or more computer processors, cause the one or more computer processors to at least:
   use a plurality of outputs to generate an aggregate output, which plurality of outputs is generated at least in part by applying said plurality of neural networks to a training data item;
   for a neural network of the plurality of neural networks, compute (i) a difference between the output of the neural network and the aggregate output, (ii) a product of a hyper-parameter and the difference computed in (i), (iii) a sum of the aggregate output and the product computed in (ii) to generate a variance-adjusted output for the neural network, and (iv) a difference between the variance-adjusted output and a pre-determined output for the training data item; and configure the plurality of neural networks to reduce the difference between the variance-adjusted output and the pre-determined output.

2. The system of claim 1, wherein the plurality of neural networks comprises a linear regression, a logistic regression, a neural network with at least one layer of hidden units, or a combination thereof.

3. The system of claim 1, wherein the plurality of outputs is combined by combining outputs of a selected subset of the plurality of neural networks, the selected subset being selected randomly, pseudo-randomly, or according to a fixed pattern.

4. The system of claim 3, wherein the plurality of outputs is combined by averaging the outputs of the selected subset of the plurality of neural networks.

5. The system of claim 1, wherein the difference between the variance-adjusted output and the desired output is computed using a squared error, an absolute error, a log-likelihood, or a cross-entropy.

6. The system of claim 1, wherein the instructions, when executed by the one or more processors, further cause the one or more processors to apply an additional neural network to the variance-adjusted output to generate an additional output, compute a difference between the additional output and the pre-determined output, and configure the plurality of neural networks to reduce the difference between the additional output and the pre-determined output.

7. The system of claim 1, wherein the plurality of neural networks is configured by adjusting one or more parameters of the plurality of neural networks by evaluating a gradient or a Hessian of a log-likelihood function or a squared error function using the pre-determined output and the variance-adjusted output.

8. The system of claim 7, wherein the gradient for each of the one or more parameters of the plurality of neural networks is computed from an average of the gradients across the plurality of neural networks.

9. The system of claim 7, wherein the one or more parameters of the plurality of neural networks are adjusted using a gradient descent, a stochastic gradient descent, a momentum, a Nesterov's accelerated momentum, an Ada-Grad, an RMSProp, a conjugate gradient, or a combination thereof.

10. The system of claim 1, wherein the instructions, when executed by the one or more processors, further cause the one or more processors to:
obtain a test data item;
compute a plurality of test outputs by applying the plurality of neural networks to the test data item; and
combine the plurality of test outputs to form an aggregate test output for the test data item.

11. The system of claim 10, wherein the plurality of test outputs is combined to form an aggregate test output by averaging the plurality of test outputs or using majority voting among the plurality of test outputs.

12. The system of claim 11, wherein the hyper-parameter is obtained by:

for each of a plurality of candidate values, computing further outputs by applying the plurality of neural networks to each of one or more held out validation data items;
computing a validation error or a validation log-likelihood for each of the further outputs; and
selecting the candidate value from the plurality of candidate values for which the lowest validation error or the highest validation log-likelihood is computed.

13. The system of claim 12, wherein the hyper-parameter and at least one other candidate value of the plurality of candidate values are obtained by applying a search technique to determine a jointly optimal hyper-parameter setting, the search technique comprising a grid search, a random search, a Bayesian hyper-parameter optimization, or a combination thereof.

14. The system of claim 12, wherein at least one of the plurality of candidate values is zero.

15. The system of claim 12, wherein at least one of the plurality of candidate values is one.

16. The system of claim 12, wherein at least one of the plurality of candidate values is greater than zero and less than one.

17. The system of claim 12, wherein at least one of the plurality of candidate values is greater than one.

18. The system of claim 1, wherein the plurality of neural networks is configured by adjusting one or more parameters of the plurality of neural networks.

19. The system of claim 1, wherein the instructions, when executed by the one or more processors, further cause the one or more processors to select the hyper-parameter by evaluating the accuracy of two or more candidate hyper-parameters, wherein at least one of the two or more candidate hyper-parameters is greater than zero and not equal to one.

20. The system of claim 19, wherein the instructions, when executed by the one or more processors, further cause the one or more processors to:
obtain a data item for which a prediction is to be made;
compute a plurality of prediction outputs by applying the plurality of neural networks to the data item for which the prediction is to be made; and
combine the plurality of prediction outputs to form an aggregate prediction.

21. A system for training a neural network, the system comprising one or more processors and one or more computer-readable media storing instructions that, when executed by the one or more processors, cause the one or more processors to:
use a plurality of training outputs to generate an aggregate output, which plurality of training outputs is generated at least in part by repeatedly applying the neural network to a training data item, wherein applying the neural network to the training data item comprises disabling at least one hidden unit or input unit of the neural network (i) randomly with a predetermined probability, (ii) pseudo-randomly with the predetermined probability, (iii) using a predetermined set of binary masks with the predetermined probability, wherein the predetermined set of binary masks is used only once, or (iv) according to a fixed pattern with the predetermined probability;
for each of the plurality of training outputs, compute (i) a difference between the training output and the aggregate output, (ii) a product of a hyper-parameter and the difference computed in (i), (iii) a sum of the aggregate training output and the product computed in (ii) to generate a variance-adjusted training output for each of the plurality of training outputs, and (iv) a difference between the variance-adjusted training output and a pre-determined output for the training data item; and configure the neural network to reduce the difference between the variance-adjusted training outputs and the pre-determined training output.

22. The system of claim 21, wherein the instructions, when executed by the one or more processors, further cause the one or more processors to, for at least one input unit or hidden unit of the neural network that is not disabled, scale a value of the at least one input unit or hidden unit of the neural network that is not disabled by a reciprocal of a difference between one and the predetermined probability.

23. The system of claim 21, wherein the instructions, when executed by the one or more processors, further cause the one or more processors to:

scale the one or more parameters by a difference between one and the predetermined probability;

obtain a test data item; and compute a test output for the test data item by applying the neural network to the test data item.

24. The system of claim 21, wherein the instructions, when executed by the one or more processors, further cause the one or more processors to:

obtain a test data item;

compute a plurality of test outputs by repeatedly applying the neural network to the test data item, wherein applying the neural network to the test data item comprises disabling at least one hidden unit or input unit of the neural network (i) randomly with a predetermined probability, (ii) pseudo-randomly with the predetermined probability, (iii) using a predetermined set of binary masks with the predetermined probability, wherein each of the predetermined set of masks is used only once, or (iv) according to a fixed pattern with the predetermined probability; and combine the plurality of test outputs to form an aggregate test output for the test data item.

25. The system of claim 21, wherein the plurality of training outputs is combined to form the aggregate training output by averaging the plurality of training outputs or using majority voting among the plurality of training outputs.

26. The system of claim 21, wherein the instructions, when executed by the one or more processors, further cause the one or more processors to train an additional neural network by:

computing a plurality of additional training outputs by applying the additional neural network to the plurality of training outputs; and configuring the additional neural network to reduce a difference between the plurality of additional training outputs and the desired training output.

27. The system of claim 21, wherein the hyper-parameter is obtained by:

for each of a plurality of candidate values, computing further outputs by applying the neural network to each of one or more held out validation data items;

computing a sum of squared errors for each of the further outputs; and selecting the candidate value from the plurality of candidate values for which the lowest sum of squared errors is computed.

28. The system of claim 27, wherein the hyper-parameter and at least one other candidate value of the plurality of candidate values are obtained by applying a search technique to determine a jointly optimal hyper-parameter setting, the search technique comprising a grid search, a random search, a Bayesian hyper-parameter optimization, or a combination thereof.

29. The system of claim 27, wherein at least one of the plurality of candidate values is zero.

30. The system of claim 27, wherein at least one of the plurality of candidate values is one.

31. The system of claim 27, wherein at least one of the plurality of candidate values is greater than zero and less than one.

32. The system of claim 27, wherein at least one of the plurality of candidate values is greater than one.

33. The system of claim 21, wherein the neural network is configured by adjusting one or more parameters of the neural network.

34. The system of claim 21, wherein the instructions, when executed by the one or more processors, further cause the one or more processors to select the hyper-parameter by evaluating the accuracy of two or more candidate hyper-parameters, wherein at least one of the two or more candidate hyper-parameters is greater than zero and not equal to one.

* * * * *